(12) United States Patent
Sasaki

(10) Patent No.: US 10,223,039 B2
(45) Date of Patent: Mar. 5, 2019

(54) INFORMATION PROCESSING SYSTEM FOR HELPING A USER OF AN ELECTRONIC DEVICE

(71) Applicant: Tohru Sasaki, Kanagawa (JP)

(72) Inventor: Tohru Sasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/889,382

(22) Filed: Feb. 6, 2018

(65) Prior Publication Data

US 2018/0275926 A1 Sep. 27, 2018

(30) Foreign Application Priority Data

Mar. 21, 2017 (JP) .................................. 2017-055088

(51) Int. Cl.
G06F 3/12 (2006.01)

(52) U.S. Cl.
CPC .......... G06F 3/1203 (2013.01); G06F 3/1205 (2013.01); G06F 3/1229 (2013.01); G06F 3/1284 (2013.01)

(58) Field of Classification Search
CPC .... G06F 3/1203; G06F 3/1205; G06F 3/1229; G06F 3/1256; G06F 3/1284
USPC ................. 358/1.1–1.18, 474, 402
See application file for complete search history.

(56) References Cited

U.S. PATENT DOCUMENTS

| | | | | |
|---|---|---|---|---|
| 8,879,078 B2* | 11/2014 | Tsujimoto | ............... | G06F 9/453 358/1.13 |
| 2007/0101273 A1* | 5/2007 | Lin | ....................... | G06F 19/708 715/738 |
| 2009/0217303 A1* | 8/2009 | Grechanik | ............... | G06F 8/38 719/320 |
| 2018/0246740 A1* | 8/2018 | Maemura | ............... | G06F 9/453 |

FOREIGN PATENT DOCUMENTS

| | | |
|---|---|---|
| JP | H11-308398 | 11/1999 |
| JP | 2007-206999 | 8/2007 |
| JP | 2016-045635 | 4/2016 |

* cited by examiner

*Primary Examiner* — Gabriel I Garcia
(74) *Attorney, Agent, or Firm* — IPUSA, PLLC

(57) ABSTRACT

An information processing system includes an electronic device configured to display help content for helping a user of the electronic device; and an information processing apparatus configured to provide the help content to the electronic device. The information processing apparatus is arranged outside of the electronic device. The information processing system includes a processor executing a process including accepting, from the user of the electronic device, an operation for displaying the help content; requesting to display the help content, upon specifying a screen identifier and device information of the electronic device, the screen identifier including an identifier of a screen displayed on an operation part of the electronic device when the operation has been accepted; and acquiring, from the information processing apparatus, the help content compatible with the specified screen identifier and device information, and displaying the acquired help content on the operation part.

12 Claims, 14 Drawing Sheets

FIG.8

| MODEL NAME | DESTINATION | DISPLAY LANGUAGE | COMPATIBILITY STATUS |
|---|---|---|---|
| aaa | DOMESTIC | JAPANESE | ○ |
| | | ENGLISH | ○ |
| | | CHINESE | ○ |
| | NORTH AMERICA | JAPANESE | ○ |
| | | ENGLISH | ○ |
| | | CHINESE | ○ |
| | EUROPE | JAPANESE | ○ |
| | | ENGLISH | ○ |
| | | CHINESE | ○ |
| bbb | DOMESTIC | JAPANESE | × |
| | | ENGLISH | × |
| | | CHINESE | × |
| | NORTH AMERICA | JAPANESE | × |
| | | ENGLISH | × |
| | | CHINESE | × |
| | EUROPE | JAPANESE | × |
| | | ENGLISH | × |
| | | CHINESE | × |

| MODEL NAME | SCREEN IDENTIFIER | CONTENT ID | CONTENT |
|---|---|---|---|
| aaa | id_copy_top | id_copy_top_2 | I WANT TO KNOW THE METHOD OF COPYING EACH OF THE FRONT AND BACK SIDES OF A DOUBLE-SIDED DOCUMENT ONTO ONE SIDE OF A SHEET |
| | id_copy_xxx | | — |
| | id_scan_top | | — |
| | ... | | ... |
| bbb | id_copy_top | | — |
| | id_copy_xxx | | — |
| | id_scan_top | | — |
| | ... | | ... |
| MODEL COMMON CONTENT | id_copy_top | id_copy_top_1 | I WANT TO KNOW ABOUT A METHOD OF PRINTING PAGE NUMBERS AT THE TIME OF COPYING |
| | | id_copy_top_2 | I WANT TO KNOW THE METHOD OF COPYING EACH OF THE FRONT AND BACK SIDES OF A DOUBLE-SIDED DOCUMENT ONTO ONE SIDE OF A SHEET |
| | | id_copy_top_3 | I WANT TO CHANGE THE ITEMS AND CONTENTS DISPLAYED ON THE INITIAL SCREEN |
| | id_copy_xxx | | ... |
| | id_scan_top | | ... |
| | ... | | ... |

Rows above grouped as 2001 (aaa, bbb) and 2002 (MODEL COMMON CONTENT).

FIG.13

INFORMATION PROCESSING SYSTEM FOR HELPING A USER OF AN ELECTRONIC DEVICE

CROSS-REFERENCE TO RELATED APPLICATION

The present application claims priority under 35 U.S.C. § 119 to Japanese Patent Application No. 2017-055088, filed on Mar. 21, 2017, the contents of which are incorporated herein by reference in their entirety.

BACKGROUND OF THE INVENTION

1. Field of the Invention

The present invention relates to an information processing system, a help display method, and an electronic device.

2. Description of the Related Art

For example, there has been a technique for implementing a help function on an operation part so that when a problem occurs while using an image forming apparatus, the user can resolve the problem by the user himself/herself on the spot.

The related art discloses a help system in which a network device such as an image forming apparatus or a household electric appliance dynamically generates a help page. Specifically, the network device dynamically generates the help page corresponding to a user authority and an option installation state, in response to a request from the client terminal, and responds to the client terminal (see, for example, Patent Document 1).

Patent Document 1: Japanese Unexamined Patent Application Publication No. 2007-206999

SUMMARY OF THE INVENTION

An aspect of the present invention provides an information processing system, a help display method, and an electronic device in which one or more of the disadvantages of the related art are reduced.

According to one aspect of the present invention, there is provided an information processing system including an electronic device configured to display help content for helping a user of the electronic device; and an information processing apparatus configured to provide the help content to the electronic device, the information processing apparatus being arranged outside of the electronic device, the information processing apparatus communicating with the electronic device over a communication channel, wherein the information processing system includes a processor, in communication with a memory, executing a process including accepting, from the user of the electronic device, an operation for displaying the help content, the operation being input via an operation part including a user interface of the electronic device; requesting to display the help content, upon specifying a screen identifier and device information of the electronic device, the screen identifier including an identifier of a screen that has been displayed on the operation part of the electronic device when the operation for displaying the help content has been accepted; acquiring, from the information processing apparatus, the help content compatible with the screen identifier of the screen and the device information of the electronic device that have been specified; and displaying the acquired help content on the operation part of the electronic device.

BRIEF DESCRIPTION OF THE DRAWINGS

FIG. 8 is a configuration diagram of an example of a help function compatibility model check table according to the first embodiment of the present invention;

FIG. 13 is a configuration diagram of an example of the help content presence/absence management information according to the second embodiment of the present invention.

DETAILED DESCRIPTION OF THE PREFERRED EMBODIMENTS

In the related art, in consideration of customizability of help contents, a help function, which is implemented on an operation part of an electronic device such as an image forming apparatus, is preferably stored in an external apparatus such as a server apparatus capable of communicating with the electronic device via a network. However, in an information processing system in which help contents are stored in an external device, there are cases where additions and edits are performed in order to enhance the help contents, etc.

Therefore, in an electronic device for which help contents are stored in an external device, in order to acquire help content from the external device, a mechanism is required for selecting and acquiring help content compatible with the model, etc., of the electronic device.

A problem to be solved by an embodiment of the present invention is to provide an information processing system enabling an electronic device that displays help content, to acquire help content compatible with the model, etc., of the electronic device, from outside.

Embodiments of the present invention will be described by referring to the accompanying drawings.

[First Embodiment]

<Hardware Configuration-First Embodiment>

Figure 1:
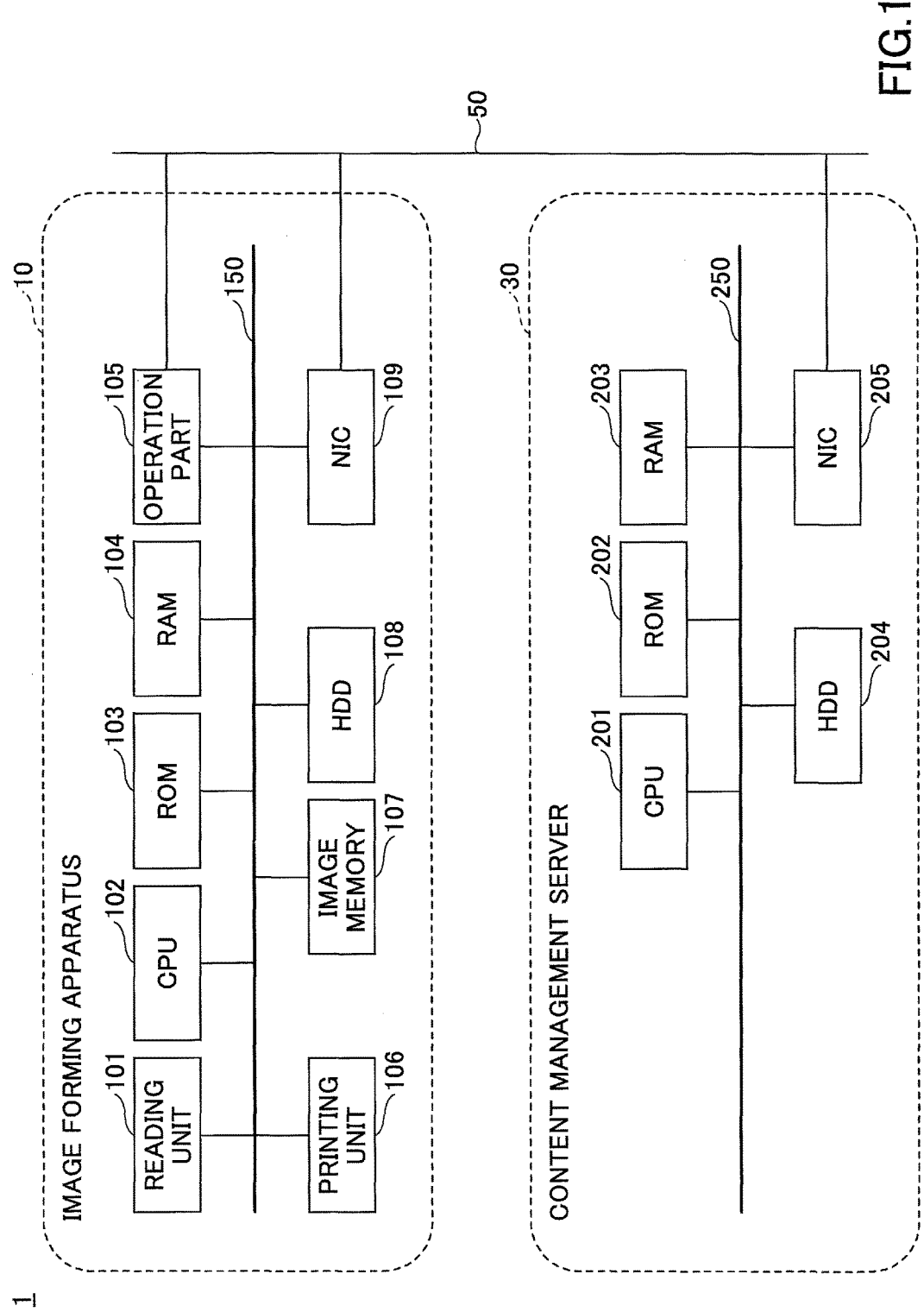
FIG. 1 is a hardware block diagram of an example of an information processing system according to a first embodiment of the present invention.

A hardware configuration of an information processing system 1 according to the present embodiment will be described with reference to FIG. 1. FIG. 1 is a hardware block diagram of an example of the information processing system 1 according to the present embodiment. The information processing system 1 illustrated in FIG. 1 has a configuration in which an image forming apparatus 10 and a content management server 30 are connected via a network 50 such as a Local Area Network (LAN) or the Internet.

The image forming apparatus 10 is an example of an electronic device. In the example of FIG. 1, the image forming apparatus 10 is a multifunction peripheral (MFP); however, the image forming apparatus 10 is not limited to a multifunction peripheral. The multifunction peripheral is a device including a plurality of functions such as a printing function, a scanner function, and a copy function, etc. The content management server 30 is an example of an information processing apparatus. The content management server 30 manages help contents and provides the help contents to the image forming apparatus 10.

The image forming apparatus 10 includes a reading unit 101, a central processing unit (CPU) 102, a read-only memory (ROM) 103, a random access memory (RAM) 104, an operation part 105, a printing unit 106, an image memory 107, a hard disk drive (HDD) 108, and a network interface card (NIC) 109, etc.

The operation part 105 includes a Graphical User Interface (GUI) for the user to operate the image forming apparatus 10. The operation part 105 may be implemented by an information processing terminal such as a tablet terminal, for example. The operation part 105 may have a communication function for connecting to the network 50.

The CPU 102 is an arithmetic device for processing images and information. The CPU 102 loads programs, data, and setting information, etc., from the ROM 103 and the HDD 108, etc., into the RAM 104, and executes processes, thereby controlling the operations of the entire image forming apparatus 10 and implementing various functions.

The ROM 103 is a read-only storage device for storing programs and data. The RAM 104 is a storage device for reading and writing programs and data in order to temporarily store programs and data. The HDD 108 is a storage device that stores image data and setting data. The NIC 109 is a network interface card, and is an example of a communication device for connecting the image forming apparatus 10 to the network 50. The image memory 107 is a storage device that stores image data for performing image processing.

The reading unit 101 is a reading device for reading image data (electronic data) from an original document and generating an image file (electronic file). The printing unit 106 is a printing device for printing print data on a conveyed object. The conveyed object is not limited to paper; for example, the conveyed object may be coated paper, thick paper, an overhead projector film (OHP film), a plastic film, prepreg, and copper foil, etc.

The content management server 30 includes a CPU 201, a ROM 202, a RAM 203, an HDD 204, and a NIC 205, etc. The CPU 201 is an arithmetic device for processing images and information. The ROM 202 is a read-only storage device for storing programs and data. The RAM 203 is a storage device for reading and writing programs and data in order to temporarily store programs and data. The HDD 204 is a storage device that stores image data and setting data. The NIC 205 is a network interface card, and is an example of a communication device for connecting the content management server 30 to the network 50.

<Software Configuration-First Embodiment>

Figure 2:
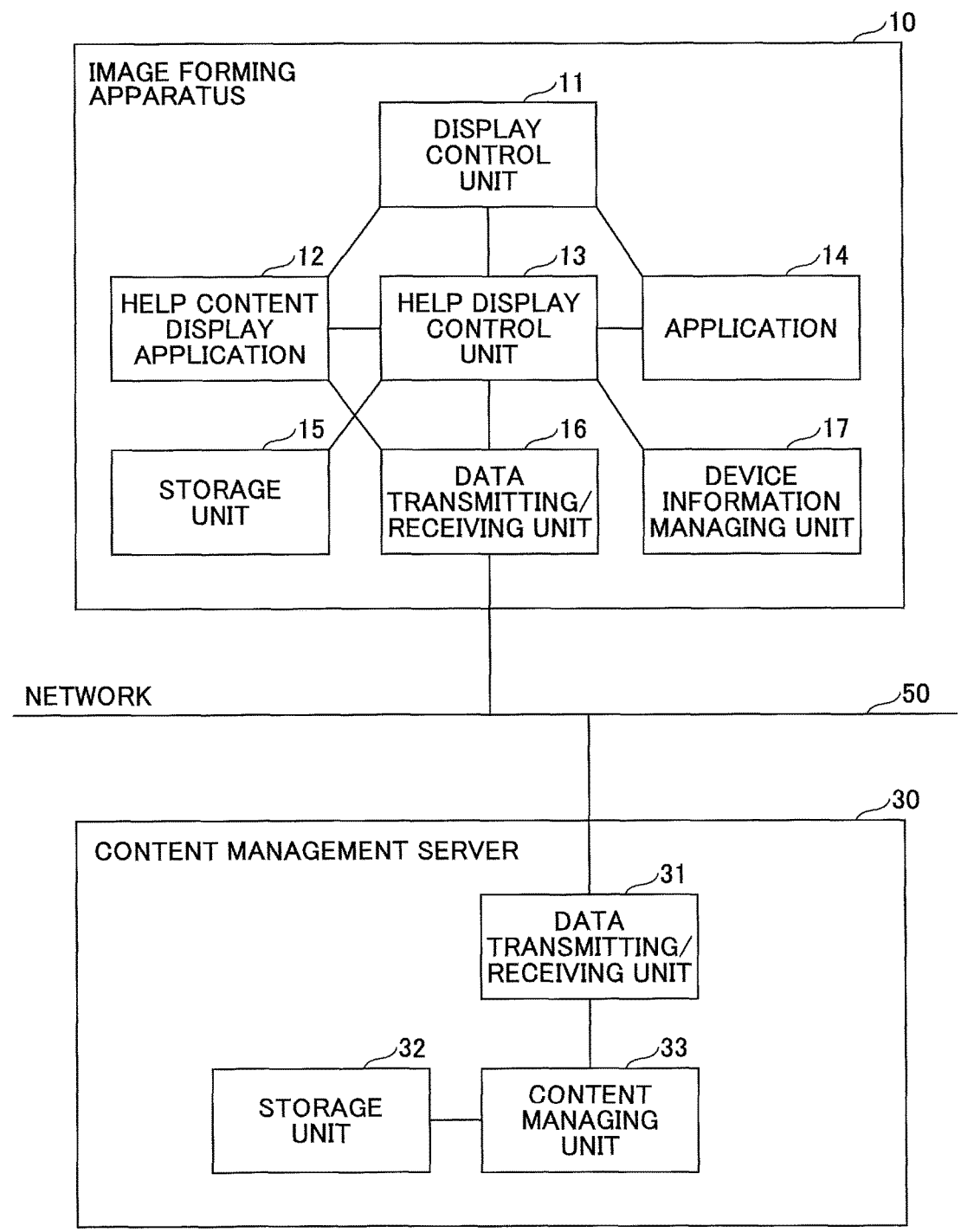
FIG. 2 is a software configuration diagram of an example of the information processing system according to the first embodiment of the present invention.

Next, a functional configuration of the information processing system 1 according to the present embodiment will be described. FIG. 2 is a software configuration diagram of an example of the information processing system 1 according to the present embodiment.

The image forming apparatus 10 in FIG. 2 has a configuration including a display control unit 11, a help content display application 12, a help display control unit 13, an application 14, a storage unit 15, a data transmitting/receiving unit 16, and a device information managing unit 17. Furthermore, the content management server 30 has a configuration including a data transmitting/receiving unit 31, a storage unit 32, and a content managing unit 33.

The display control unit 11 is implemented by the operation part 105. The display control unit 11 is a user interface for enabling the user to make settings for the image forming apparatus 10 and to display processing states of the image forming apparatus 10. The help content display application 12 is implemented by the CPU 102, the ROM 103, and the RAM 104. The help content display application 12 is a display application for displaying help contents. The help content display application 12 is an application having a browser function for displaying help contents created in html, for example.

The help display control unit 13 is implemented by the CPU 102, the ROM 103, and the RAM 104. When a help function is used, the help display control unit 13 determines appropriate help content compatible with the model, etc., of the electronic device according to the properties and state of the application 14 used by the user, and performs display control. The application 14 is implemented by the CPU 102, the ROM 103, and the RAM 104. The application 14 is a program for implementing functions such as copying, scanning, and fax transmission, etc. In order for the application 14 to use the help function, the application 14 needs to be compatible with the help function.

The storage unit 15 is implemented by the HDD 108. The storage unit 15 stores device information and data for job execution. The data transmitting/receiving unit 16 is implemented by the NIC 109. The data transmitting/receiving unit 16 transmits and receives data to and from the content management server 30 via the network 50. The device information managing unit 17 is implemented by the CPU 102, the ROM 103, and the RAM 104. The device information managing unit 17 manages the settings and information possessed by the image forming apparatus 10, such as the model name, the destination, and the display language.

The data transmitting/receiving unit 31 is implemented by the NIC 205. The data transmitting/receiving unit 16 transmits and receives data to and from the image forming apparatus 10 via the network 50. The storage unit 32 is implemented by the HDD 204. The storage unit 32 stores help content information. The content managing unit 33 is implemented by the CPU 201, the ROM 202, and the RAM 203. The content managing unit 33 decodes a request notified via the network 50 and identifies help content information. The content managing unit 33 reads the identified help content information from the storage unit 32, and responds to the image forming apparatus 10.

<Details of Processes-First Embodiment>

Next, a process of displaying help contents on the operation part 105 of the image forming apparatus 10 in the information processing system 1 according to the present embodiment, will be described.

<<Help Key-First Embodiment>>

Figure 3:
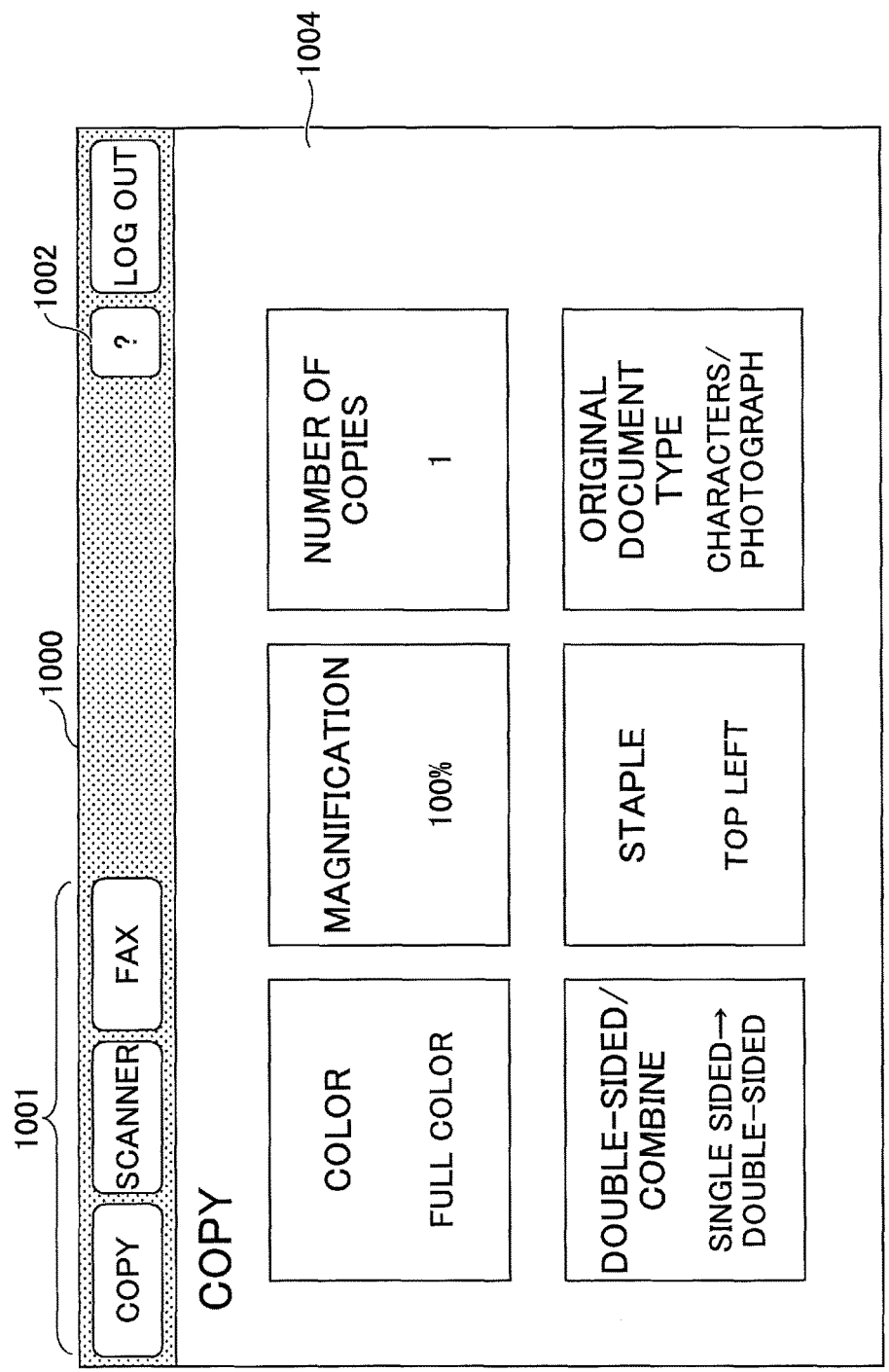
FIG. 3 is an image diagram of an example of an operation screen including a help key according to the first embodiment of the present invention.

FIG. 3 is an image diagram of an example of an operation screen including a help key. An operation screen 1000 of FIG. 3 is displayed on the operation part 105 of the image forming apparatus 10. The operation screen 1000 is an example in which a help key 1002 is arranged at a position where the help key 1002 can always be pressed. The help key 1002 in FIG. 3 is arranged in an upper banner for displaying keys relating to system control such as application switching shortcut keys 1001 and a login/logout key. An application screen 1004 is an example in which a copy application screen is displayed. Note that the help key 1002 may be arranged as a hard key or on the application screen 1004.

<<Help Screen-First Embodiment>>

Figure 4:
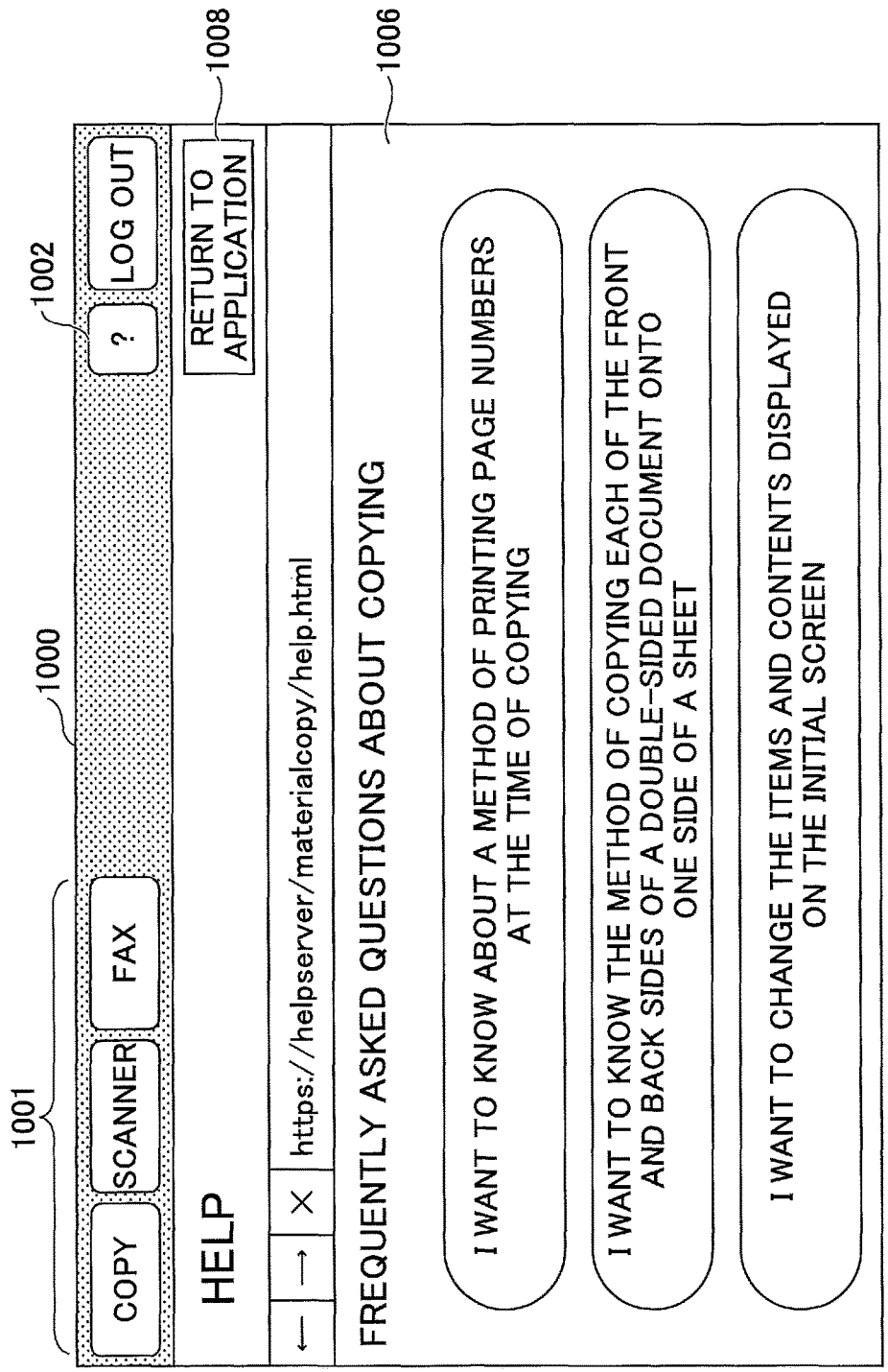
FIG. 4 is an image diagram of an example of an operation screen on which a help screen is displayed, according to the first embodiment of the present invention.

The user can display a help screen 1006 as illustrated in FIG. 4 by pressing the help key 1002. FIG. 4 is an image diagram of an example of an operation screen on which the help screen 1006 is displayed. The help screen 1006 of FIG. 4 is displayed by the help content display application 12.

The help screen 1006 of FIG. 4 assumes a case where the help key 1002 has been pressed when the copy application screen of FIG. 3 is displayed as the application screen 1004. For this reason, help relating to the copy application is displayed on the help screen 1006 of FIG. 4, and help for a scanner application or a fax application is not displayed. Furthermore, when the help key 1002 is pressed while an error screen is being displayed, since it is clear that the purpose is wanting to know the means for solving an error, it is possible to display an error solving means so that the user's problem can be directly solved. When a return to application button 1008 is pressed, the operation screen 1000 of FIG. 4 returns to the operation screen 1000 of FIG. 3 that is the original operation screen 1000.

<<Process when Help Key is Pressed-First Embodiment>>

Figure 5:
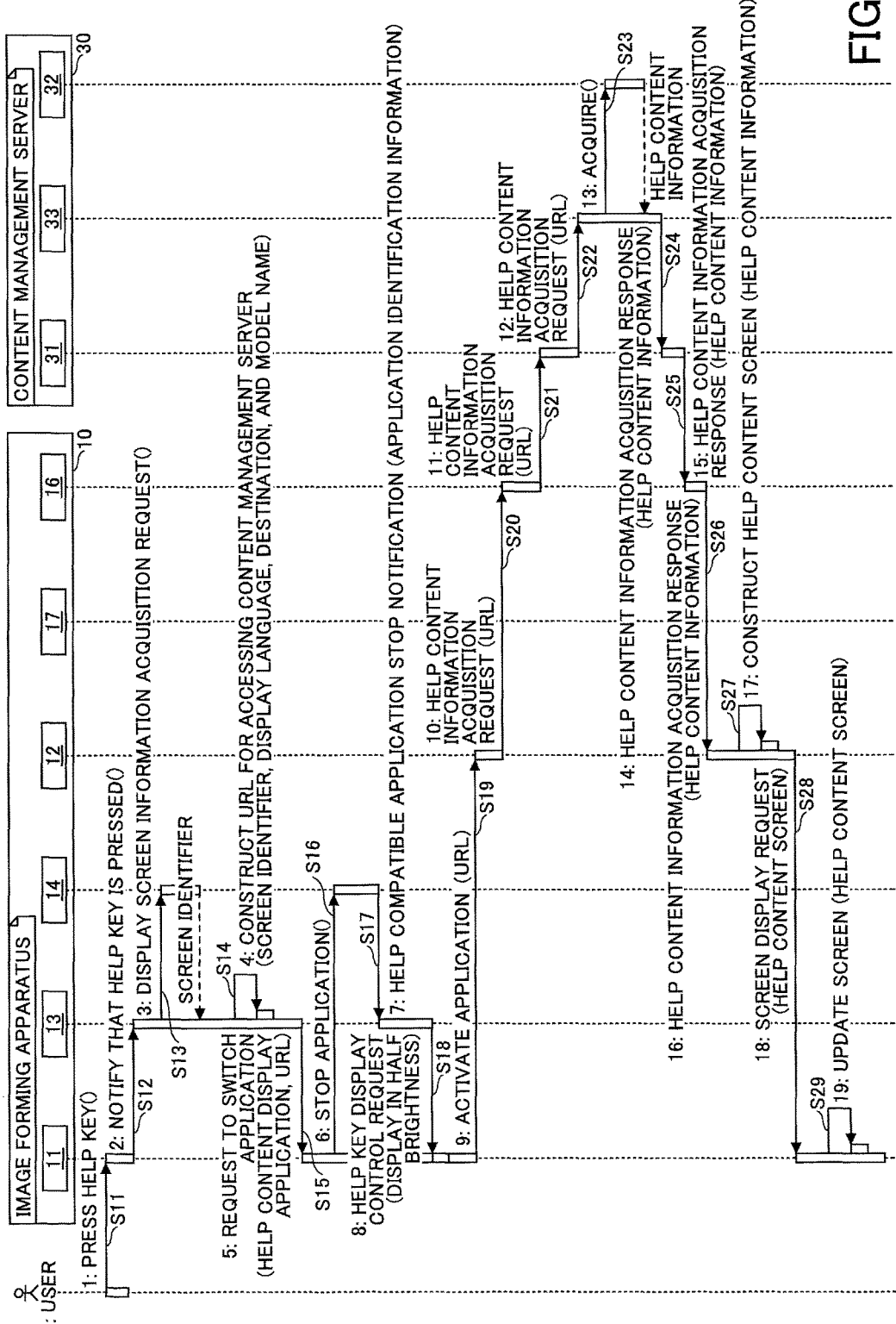
FIG. 5 is a sequence diagram of an example of a process performed when the help key is pressed, according to the first embodiment of the present invention.

FIG. 5 is a sequence diagram of an example of a process performed when the help key is pressed. The sequence diagram of FIG. 5 illustrates the process from when the user presses the help key 1002 until the help content is displayed, when the help function can be used.

In step S11, the user of the image forming apparatus 10 presses the help key 1002 arranged on the operation screen 1000 in FIG. 3, for example. When the help key 1002 is pressed by the user, in step S12, the display control unit 11 of the image forming apparatus 10 notifies the help display control unit 13 of the pressing of the help key 1002.

In step S13, the help display control unit 13 issues a display screen information acquisition request to the currently displayed application 14, and acquires the screen identifier of the currently displayed application screen 1004 from the application 14. For example, taking the operation screen 1000 of FIG. 3 as an example, the screen identifier is an ID such as "id_copy_top" indicating that the screen is the top screen of the copy application.

The process proceeds to step S14, and the help display control unit 13 constructs a URL for accessing the content management server 30 based on device information such as the model name and the screen identifier acquired in step S13. The process proceeds to step S15, and the help display control unit 13 specifies the URL constructed in step S14, and issues a request to switch the application to the display control unit 11, so as to display the help content display application 12.

The process proceeds to step S16, and the display control unit 11 requests the application 14 currently displayed to stop. In step S17, the application 14 specifies the application identification information and issues a help compatible application stop notification to the help display control unit 13. In step S18, the help display control unit 13 receives the help compatible application stop notification from the application 14 and makes a help key display control request for displaying the help key 1002 in half brightness. Accordingly, the help key 1002 on the operation screen 1000 is displayed in half brightness and cannot be pressed.

In step S19, the display control unit 11 specifies the URL and activates the help content display application 12. In steps S20 to S21, the help content display application 12 accesses the specified URL and makes a request for acquiring help content information.

The content managing unit 33 of the content management server 30 that received the help content information acquisition request in step S22, proceeds to step S23, and acquires the corresponding help content information from the storage unit 32. In steps S24 to S26, the content managing unit 33 returns the acquired help content information to the help content display application 12.

In step S27, the help content display application 12 constructs a help content screen based on the help content information returned from the content management server 30. In step S28, the help content display application 12 specifies the constructed help content screen and issues a screen display request to the display control unit 11. In step S29, the display control unit 11 displays the specified help content screen on the operation screen 1000, for example, as the help screen 1006 as illustrated in FIG. 4.

<<Process when Activating Image Forming Apparatus-First Embodiment>>

Figure 6:
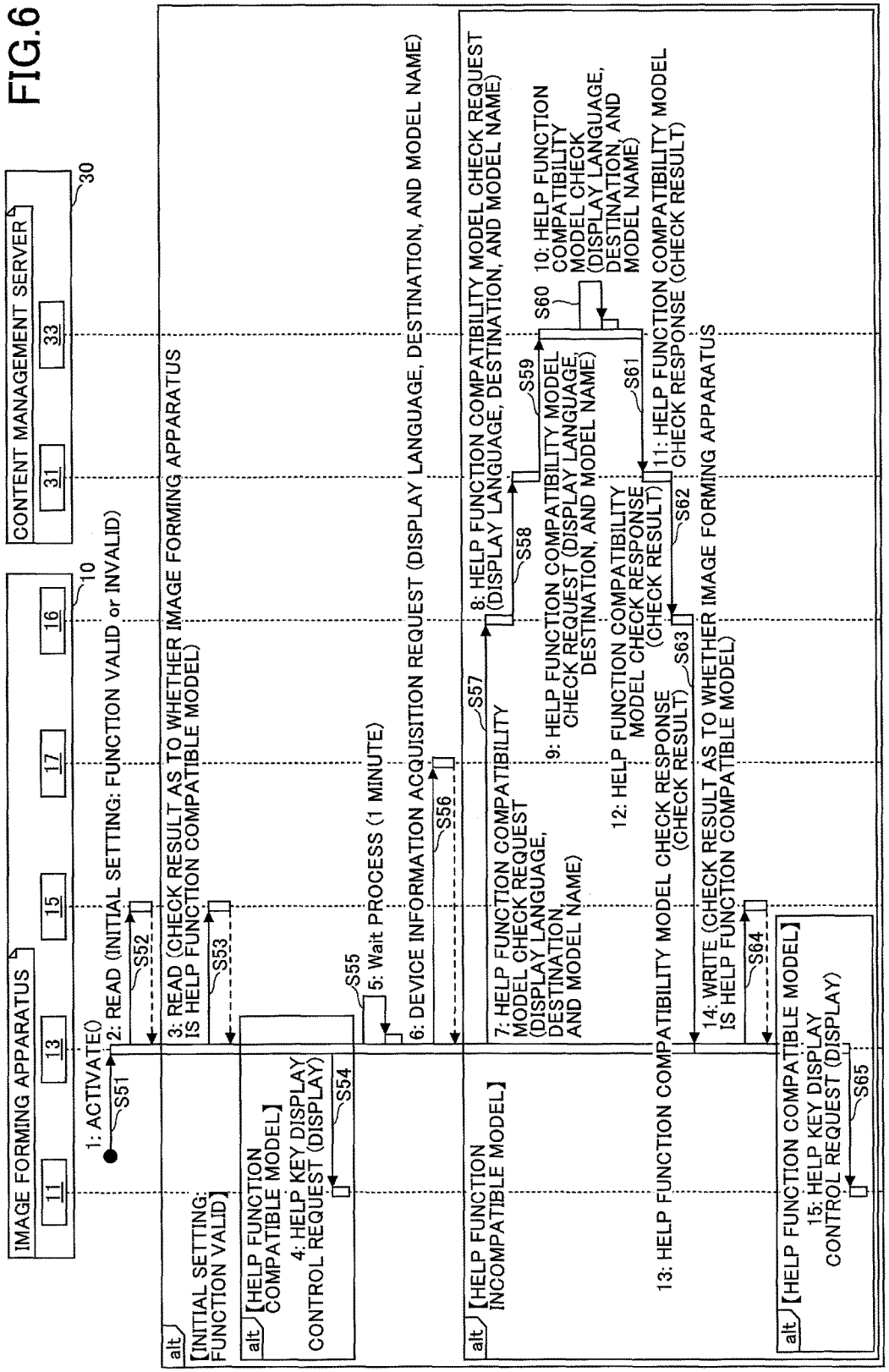
FIG. 6 is a sequence diagram of an example of a process when an image forming apparatus is activated, according to the first embodiment of the present invention.

FIG. 6 is a sequence diagram of an example of a process when the image forming apparatus 10 is activated. In the sequence diagram of FIG. 6, help function compatibility model check is performed. The help function is not always available depending on the device setting state and the state of the content management server 30. Therefore, in FIG. 6, help function compatibility model check for checking whether the help function can be used, is performed at the time of activating the image forming apparatus 10.

In steps S51 to S52, the help display control unit 13 reads an initial setting indicating validity/invalidity of the help function from the storage unit 15 at the time of activation. When the help function is set to be invalid, the help display control unit 13 does not perform any particular process. As a result, the help key 1002 is not displayed on the operation screen 1000. Therefore, since the user cannot press the help key 1002, the help function cannot be used.

When the help function is set to be valid and it is already known that the image forming apparatus 10 is a model that is compatible with the help function (hereinafter, "help function compatible model"), the processes of steps S53 to S56 in FIG. 6 are executed. Note that the case where it is already known that the image forming apparatus 10 is a help function compatible model, is a case where a previous check result indicating help function compatible model is stored in the storage unit 15.

When the help function is set to be valid, the help display control unit 13 proceeds to step S53 and reads the check result as to whether the image forming apparatus 10 is a help function compatible model, from the storage unit 15. Then, when the check result as to whether the image forming apparatus 10 is a help function compatible model, indicates help function compatible model, in step S54, the help display control unit 13 makes a help key display control request for displaying the help key 1002.

In step S55, the help display control unit 13 performs a wait process so that there is no influence on the activation processing performance, and then proceeds to step S56 to make a device information acquisition request to acquire device information (the display language, the destination, and the model name) necessary when using the help function. Note that the wait process is not always necessary if the influence on the activation processing performance is not considered.

Furthermore, even when the help key 1002 is pressed, the help content screen cannot be displayed until the device information is acquired, and therefore it is possible to express to the user that the help function cannot be used, for example, by displaying the help key 1002 in half brightness. Furthermore, the help key 1002 may be displayed after the help function becomes available.

In the case where the help function is set to be valid and the result of the help function compatibility model check indicates "help function incompatible model", the processes of steps S53 and S55 to S64 in FIG. 6 are executed. Note that a case where the result indicates help function incompatible model includes a state where the image forming apparatus 10 is a help function compatible model but cannot connect to the network 50 and the connection with the content management server 30 cannot be confirmed.

When the help function is set to be valid, the help display control unit 13 proceeds to step S53, and reads the check result as to whether the image forming apparatus 10 is a help function compatible model, from the storage unit 15. Then, the help display control unit 13 skips step S54 because the check result as to whether the image forming apparatus 10 is a help function compatible model, is not a check result indicating a help function compatible model. In step S55, the wait process is performed so that there is no influence on the activation processing performance. Then, in step S56, the device information (the display language, the destination, and the model name) necessary for using the help function is acquired from the device information managing unit 17.

In steps S57 to S59, the help display control unit 13 specifies a display language, a destination, and a model name, and issues a help function compatibility model check request. In step S60, the content managing unit 33 of the content management server 30 performs the help function compatibility model check based on the specified display language, destination, and model name. In this case, the check result as to whether the image forming apparatus 10 is a help function compatible model, indicates a help function incompatible model.

In steps S61 to S63, the content managing unit 33 returns, to the help display control unit 13 of the image forming apparatus 10, a check result indicating help function incompatible model, as the check result of the help function compatibility model check. Proceeding to step S64, the help display control unit 13 writes the check result of the help function compatibility model check returned from the content management server 30, in the storage unit 15, as a check result as to whether the image forming apparatus 10 is a help function compatible model.

The help display control unit 13 does not display the help key 1002 on the operation screen 1000 because the check result indicating help function incompatible model is returned. Therefore, since the user cannot press the help key 1002, the help function cannot be used.

In the case where the help function is set to be valid and the check result of the help function compatibility model check indicates help function compatible model, the processes of step S53 and steps S55 to S65 in FIG. 6 are executed.

When the help function is set to be valid, the help display control unit 13 proceeds to step S53 and reads the check result as to whether the image forming apparatus 10 is a help function compatible model, from the storage unit 15. Then, the help display control unit 13 skips step S54 because the check result as to whether the image forming apparatus 10 is a help function compatible model is not a check result indicating help function compatible model. In step S55, the wait process is performed so that there is no influence on the activation processing performance. Then, in step S56, the device information (the display language, the destination, and the model name) necessary for using the help function is acquired from the device information managing unit 17.

In steps S57 to S59, the help display control unit 13 specifies a display language, a destination, and a model name, and issues a help function compatibility model check request. In step S60, the content managing unit 33 of the content management server 30 performs the help function compatibility model check, based on the specified display language, destination, and model name. Here, the check result of the help function compatibility model check is help function compatible model.

In steps S61 to S63, the content managing unit 33 returns, to the help display control unit 13 of the image forming apparatus 10, the check result indicating help function compatible model, as the check result of the help function compatibility model check. Proceeding to step S64, the help display control unit 13 writes the check result of the help function compatibility model check returned from the content management server 30, in the storage unit 15, as the check result as to whether the image forming apparatus 10 is a help function compatible model.

Since the check result indicating help function compatible model has been returned, the help display control unit 13 proceeds to step S65 and makes a help key display control request for displaying the help key 1002.

<<Process of Help Function Compatibility Model Check-First Embodiment>>

Figure 7:
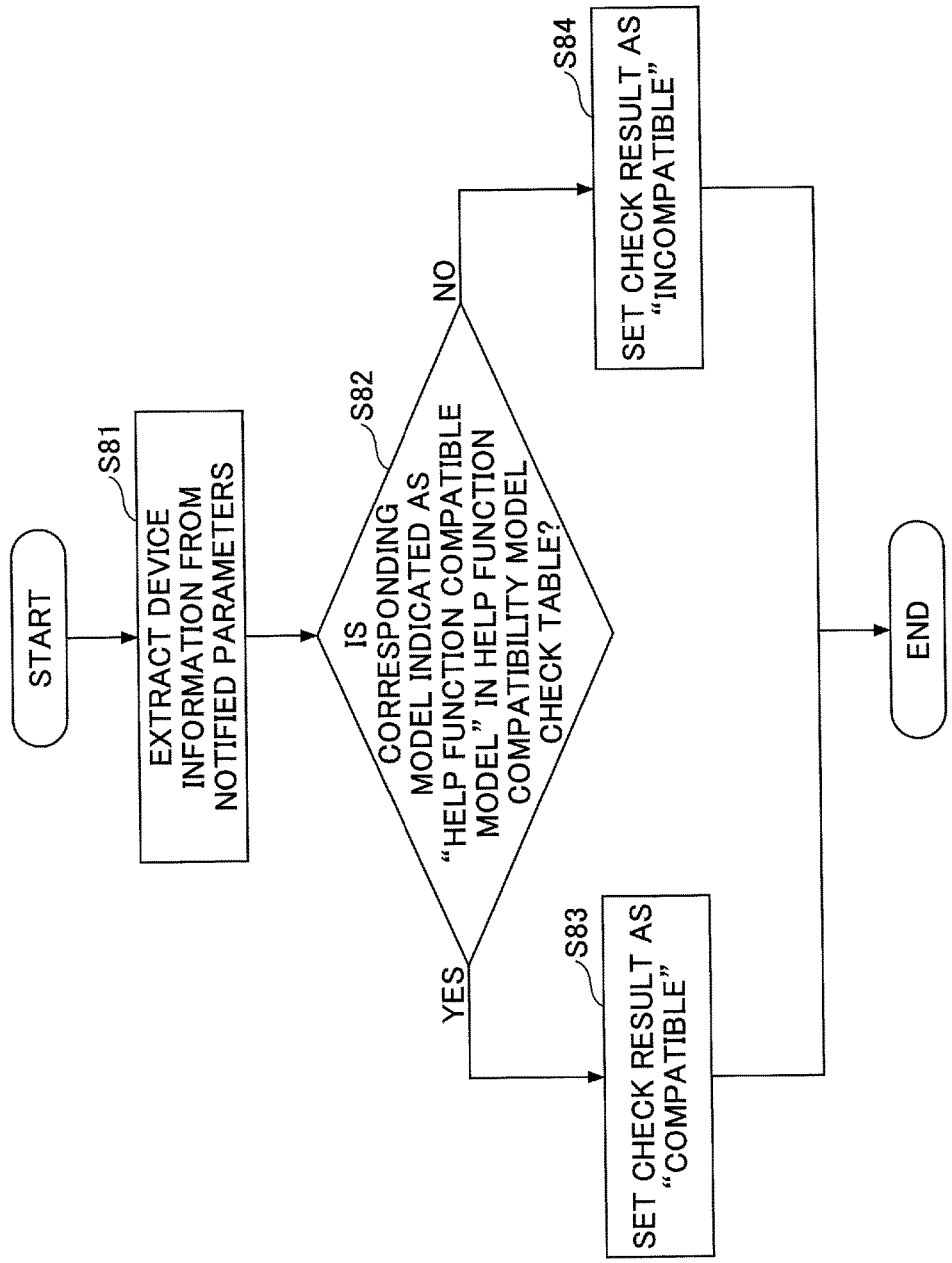
FIG. 7 is a flowchart of an example of the help function compatibility model check according to the first embodiment of the present invention.

The help function compatibility model check indicated in step S60 is performed, for example, by the procedure of the flowchart of FIG. 7. FIG. 7 is a flowchart of an example of the help function compatibility model check.

In step S81, the content managing unit 33 of the content management server 30 extracts the device information from the parameters notified by the help function compatibility model check request. The device information extracted in step S81 includes the display language, the destination, and the model name; however, if at least the model name is included, the device information will suffice.

Proceeding to step S82, the content managing unit 33 checks a help function compatibility model check table illustrated in FIG. 8, for example, based on the device information extracted in step S81. FIG. 8 is a configuration diagram of an example of a help function compatibility model check table. The help function compatibility model check table in FIG. 8 is for managing whether the image forming apparatus 10 is a help function compatible model (a model compatible with the help function) depending on the model name, the destination, and the display language.

For example, in the help function compatibility model check table of FIG. 8, the image forming apparatus 10 of the model name "aaa" is compatible with the help function, and the image forming apparatus 10 of the model name "bbb" is not compatible with the help function. Note that the help function compatibility model check table may indicate that the help function is compatible with only a specific destination or display language, even if the models are the same.

If the image forming apparatus 10, which is the source of the help function compatibility model check request, is indicated as a help function compatible model in the help function compatibility model check table, the flow proceeds to step S83, and the content managing unit 33 sets the check result as "help function compatible model". Conversely, if the image forming apparatus 10, which is the source of the help function compatibility model check request, is indicated as a help function incompatible model in the help function compatibility model check table, the flow proceeds to step S84, and the content managing unit 33 sets the check result as "help function incompatible model".

<Overview-First Embodiment>

According to the information processing system 1 according to the first embodiment, the help key 1002 is displayed on the operation screen 1000 if the image forming apparatus 10 is a help function compatible model, so that the user can use the help function. On the other hand, if the image forming apparatus 10 is a help function incompatible model, the help key 1002 is not displayed, thereby clearly indicating to the user that the help function cannot be used.

Furthermore, according to the information processing system 1 of the first embodiment, based on the screen identifier of the application screen 1004 displayed when the help key 1002 is pressed and the device information of the image forming apparatus 10, appropriate help content can be identified. Therefore, in the information processing system 1 according to the first embodiment, when the help key 1002 is pressed, the help content appropriate for the user can be displayed on the operation part 105, rather than the help function of the related art that simply displays the top page of the help content.

For example, when the help key 1002 is pressed, the help function of the related art that simply displays the top page of the help content requires time and labor of the user in order to search for the item for solving the problem, and therefore there have been cases where the user cannot reach the item for solving the problem. As a result, the user makes an inquiry to a call center, and the support cost of the device provider increases.

In the information processing system 1 according to the first embodiment, by displaying appropriate help content for the user on the operation part 105, it is possible to improve the self-resolution rate of problems occurring while using the image forming apparatus 10. Furthermore, the information processing system 1 according to the first embodiment realizes a reduction in the support cost of the device provider and a reduction in the downtime of the user work.

[Second Embodiment]

When the help key 1002 is pressed, the information processing system 1 according to a second embodiment determines whether there is any help content that can be provided. Since the second embodiment is similar to the first embodiment except some parts, descriptions of the same parts are omitted. For example, since the hardware configuration and the software configuration are the same, descriptions are omitted.

Figure 9:
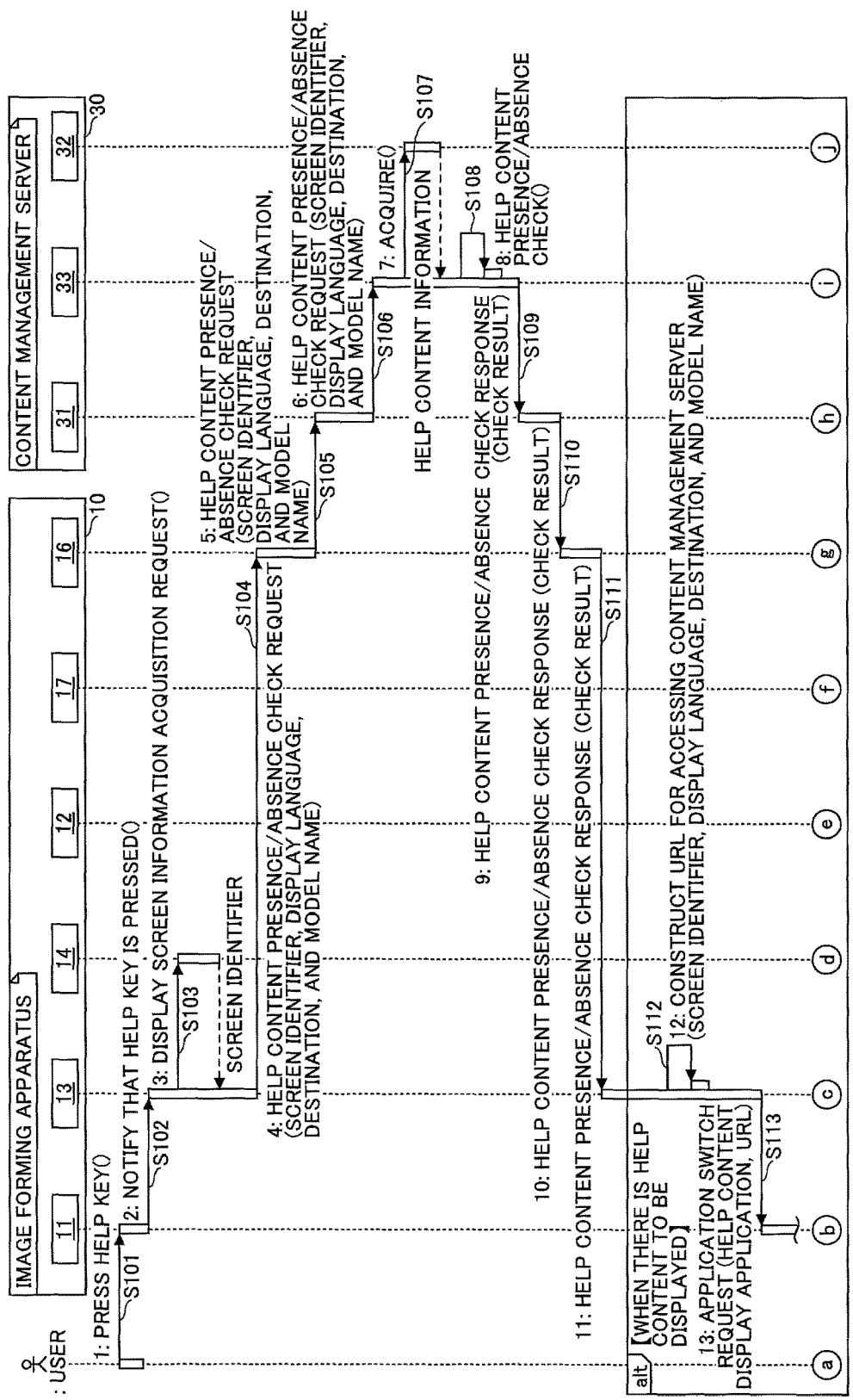
FIG. 9 is a sequence diagram (1/2) of an example of a process of determining whether there is a help content that can be provided when the help key is pressed, according to a second embodiment of the present invention.
Figure 10:
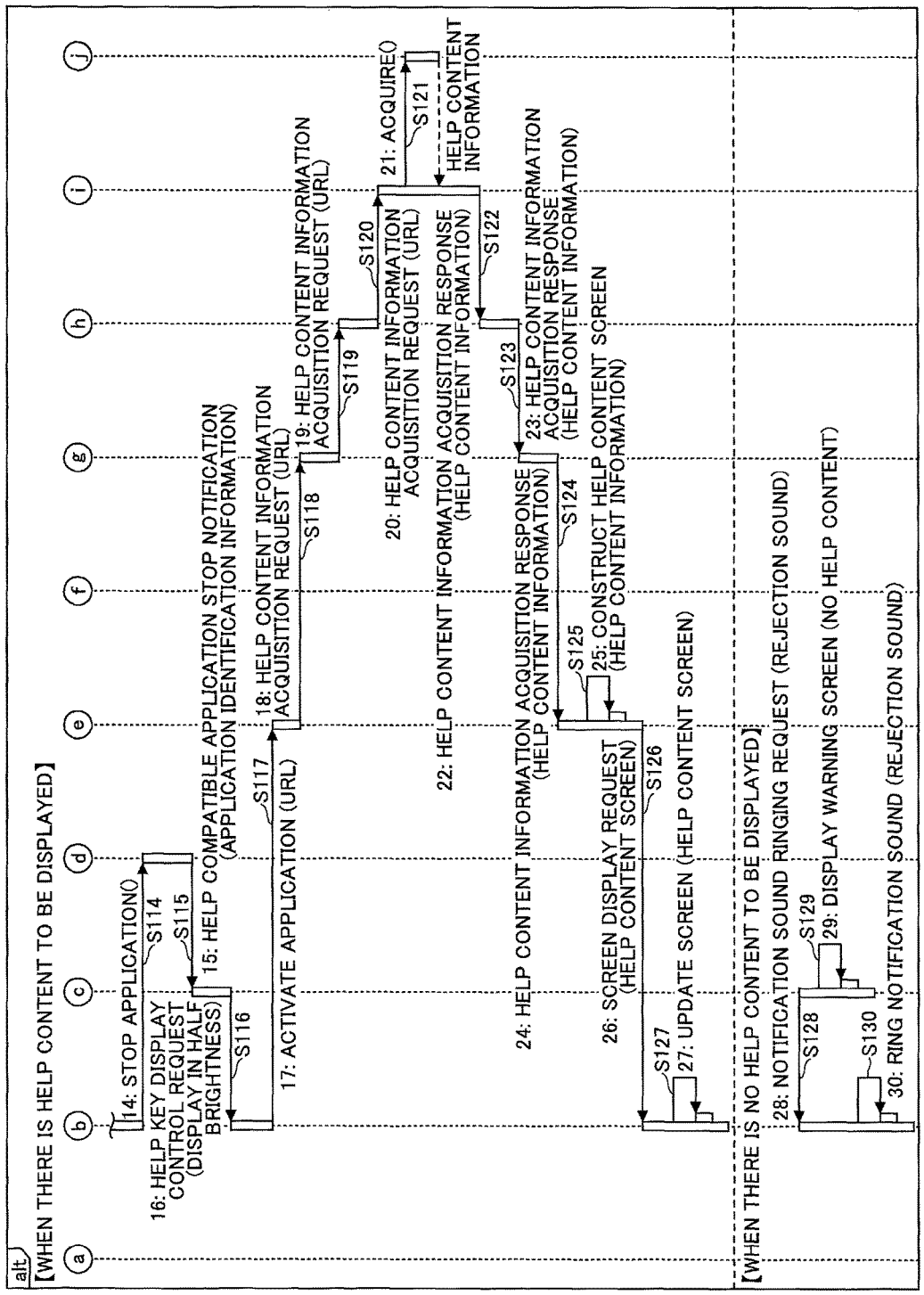
FIG. 10 is a sequence diagram (2/2) of an example of a process of determining whether there is a help content that can be provided when the help key is pressed, according to the second embodiment of the present invention.

FIGS. 9 and 10 are sequence diagrams of an example of a process of determining whether there is a help content that can be provided when the help key is pressed. The information processing system 1 according to the second embodiment does not determine whether the image forming apparatus 10 is compatible with the help function when the image forming apparatus 10 is activated, but determines whether there is any help content at the timing when the but also at the timing when the help key 1002 is pressed.

When there is help content to be displayed, the processes of steps S101 to S127 are executed. The user of the image forming apparatus 10 presses the help key 1002 arranged on the operation screen 1000 in step S101. When the help key 1002 is pressed, in step S102, the display control unit 11 of the image forming apparatus 10 notifies the help display control unit 13 of the pressing of the help key 1002.

In step S103, the help display control unit 13 issues a display screen information acquisition request to the currently displayed application 14, and acquires the screen identifier of the currently displayed application screen 1004 from the application 14.

In steps S104 to S106, the help display control unit 13 specifies a screen identifier, a display language, a destination, and a model name, and issues a help content presence/absence check request. In step S107, the content managing unit 33 of the content management server 30 acquires help content information from the storage unit 32.

Proceeding to step S108, the content managing unit 33 checks whether there is the help content information to be displayed, based on the screen identifier, the display language, the destination, and the model name specified from the image forming apparatus 10 and the help content information acquired from the storage unit 32. Details of the process of step S108 will be described later.

In steps S109 to S111, the content managing unit 33 returns the check result of the help content presence/absence check to the help display control unit 13 of the image forming apparatus 10. When there is a help content to be displayed, the help display control unit 13 proceeds to step S112 to construct a URL for accessing the content management server 30 based on the screen identifier, the display language, the destination, and the model name. In step S113, the help display control unit 13 specifies the URL constructed in step S112 and issues a request to switch the application to the display control unit 11, so as to display the help content display application 12.

The process proceeds to step S114, where the display control unit 11 requests the currently displayed application 14 to stop. In step S115, the application 14 specifies the application identification information and issues a help compatible application stop notification to the help display control unit 13. In step S116, the help display control unit 13 receives the compatible application stop notification from the application 14, and makes a help key display control request for displaying the help key 1002 in half brightness.

Proceeding to step S117, the display control unit 11 specifies the URL and activates the help content display application 12. In steps S118 to S120, the help content display application 12 accesses the specified URL and makes a help content information acquisition request. The content managing unit 33 of the content management server 30 that has received the help content information acquisition request, determines the help content information to be acquired, as described later.

In step S121, the content managing unit 33 acquires the help content information to be acquired from the storage unit 32. In steps S122 to S124, the content managing unit 33 returns the acquired help content information to the help content display application 12.

In step S125, the help content display application 12 constructs a help content screen based on the help content information returned from the content management server 30. In step S126, the help content display application 12 specifies the constructed help content screen and issues a screen display request to the display control unit 11. In step S127, the display control unit 11 displays the specified help content screen on the operation screen 1000, for example, as the help screen 1006 as illustrated in FIG. 4.

When the check result of the help content presence/absence check indicates that there is no help content to be displayed, the help display control unit 13 proceeds to step S128, and issues a notification sound ringing request to emit a rejection sound to the display control unit 11 to issue. Furthermore, the process proceeds to step S129, and the help display control unit 13 causes the operation part 105 to display a warning screen explicitly indicating that there is no help content. In step S130, the display control unit 11, which has received the sound ringing request to emit a rejection sound, rings the rejection sound and notifies the user that there is no help content.

<<Process of Help Content Presence/Absence Check-Second Embodiment>>

Figure 11:
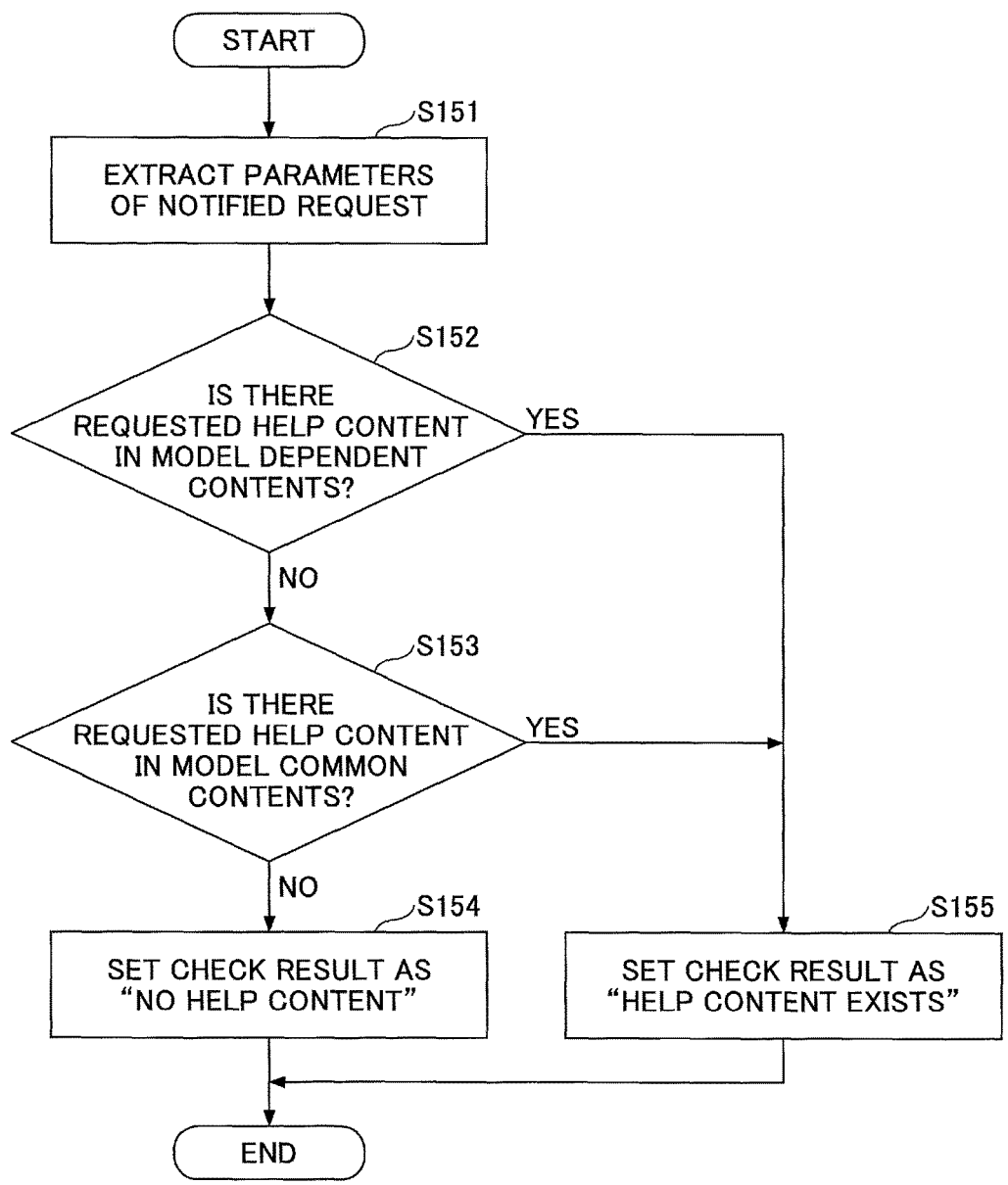
FIG. 11 is a flowchart of an example of the help content presence/absence check according to the second embodiment of the present invention.

The help content presence/absence check at step S108 is performed, for example, by the procedure of the flowchart of FIG. 11. FIG. 11 is a flowchart of an example of the help content presence/absence check.

In step S151, the content managing unit 33 of the content management server 30 extracts the parameters of the notified help content presence/absence check request. The parameters correspond to screen identifier, display language, destination, and model name.

Proceeding to step S152, the content managing unit 33 determines whether the requested help content exists in model dependent content to be described later. The content managing unit 33 can determine the model dependent content provided by the content management server 30 based on the display language, the destination, and the model name extracted in step S151. The content managing unit 33 checks whether the help content corresponding to the screen identifier exists in the determined model dependent content.

When help content corresponding to the screen identifier exists in the model dependent content, the content managing unit 33 proceeds to step S155 and sets the check result of the help content presence/absence check as "help content exists".

When help content corresponding to the screen identifier does not exist in the model dependent content, the content managing unit 33 proceeds to step S153, and determines whether the requested help content exists in model common content to be described later. The content managing unit 33 can determine the model common content provided by the content management server 30 based on the display language, the destination, and the model name extracted in step S151.

The content managing unit 33 checks whether the help content corresponding to the screen identifier exists in the determined model common content. When the help content corresponding to the screen identifier exists in the model common content, in step S155, the content managing unit 33 sets the check result of the help content presence/absence check as "help content exists". When the help content corresponding to the screen identifier does not exist in the model common content, in step S154, the content managing unit 33 sets the check result of the help content presence/absence check as "no help content".

Figure 12B:
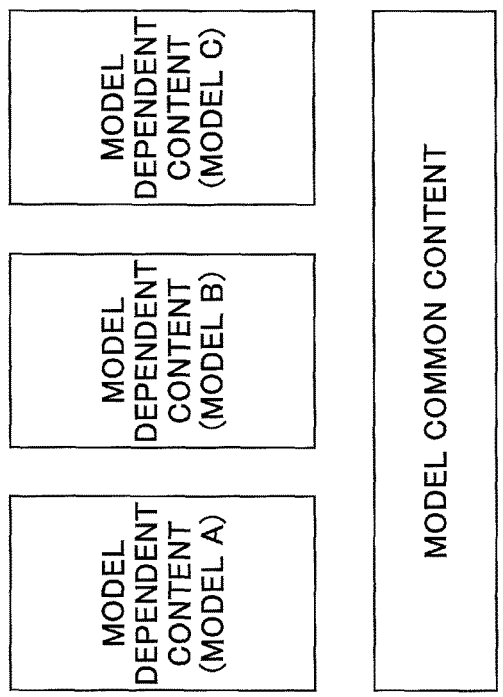
FIGS. 12A and 12B are diagrams for describing the management of help contents according to the second embodiment of the present invention.
Figure 12A:
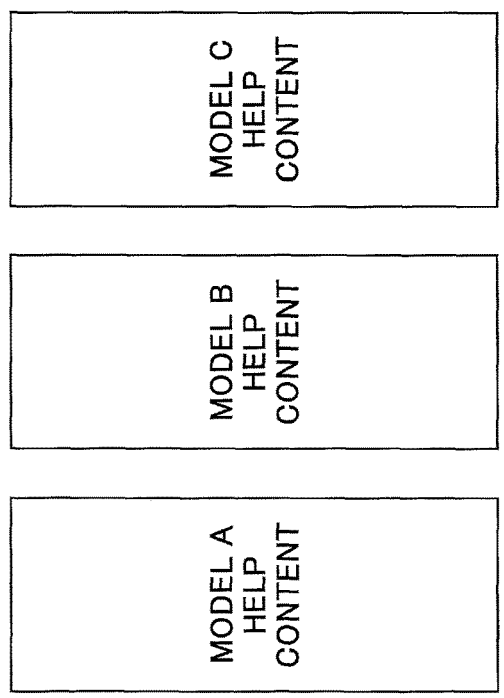

FIGS. 12A and 12B are diagrams for describing the management of help contents. FIG. 12A illustrates an example of management of help contents in the case of providing help contents on a per model basis. FIG. 12A illustrates a management method suitable for a case of determining whether to provide help content on a per model basis at the time of the activation of the image forming apparatus 10 as in the first embodiment.

FIG. 12B illustrates an example of management of help contents in the case where the help contents are divided into model common contents and the model dependent contents. FIG. 12B illustrates a management method suitable for a case of determining whether to provide help content when the help key 1002 is pressed as in the second embodiment.

<<Process for Determining Help Content Information to be Acquired-Second Embodiment>>

The process of determining the help content information to be acquired, which is performed before the process of step S121, is performed using, for example, the help content presence/absence management information of FIG. 13. FIG. 13 is a configuration diagram of an example of the help content presence/absence management information. Note that the help content presence/absence management information in FIG. 13 corresponds to the example of management of help contents in the case of dividing the help contents into model common contents and model dependent contents in FIG. 12B.

The help content presence/absence management information of FIG. 13 is divided into model dependent content presence/absence management information 2001 and model common content presence/absence management information 2002. The model name, the screen identifier, the content ID, and the help content are associated with the model dependent content presence/absence management information 2001 and the model common content presence/absence management information 2002.

For example, the help content "I want to know the method of copying each of the front and back sides of a double-sided document onto one side of a sheet" in FIG. 13 is managed as model dependent content of the content ID "id_copy_top_2" corresponding to the screen identifier "id_copy_top" of the model name "aaa". There is no model dependent content corresponding to the screen identifier "id_copy_top" of the model name "bbb".

Furthermore, in the model common content presence/absence management information 2002 of the model common content in FIG. 13, "I want to know about a method of printing page numbers at the time of copying", "I want to know the method of copying each of the front and back sides of a double-sided document onto one side of a sheet", and "I want to change the items and contents displayed on the initial screen", are managed, as help contents that are model common contents of the screen identifier "id_copy_top". Note that in the example of FIG. 13, the help content "I want to know the method of copying each of the front and back sides of a double-sided document onto one side of a sheet" is managed as model dependent content and model common content.

In the case of displaying the help content of the screen identifier "id_copy_top" in the image forming apparatus 10 of the model name "aaa", since the help content of the content ID "id_copy_top_2" is overlapping, the help content of the model dependent content is prioritized and the model common content is not displayed.

Figure 14:
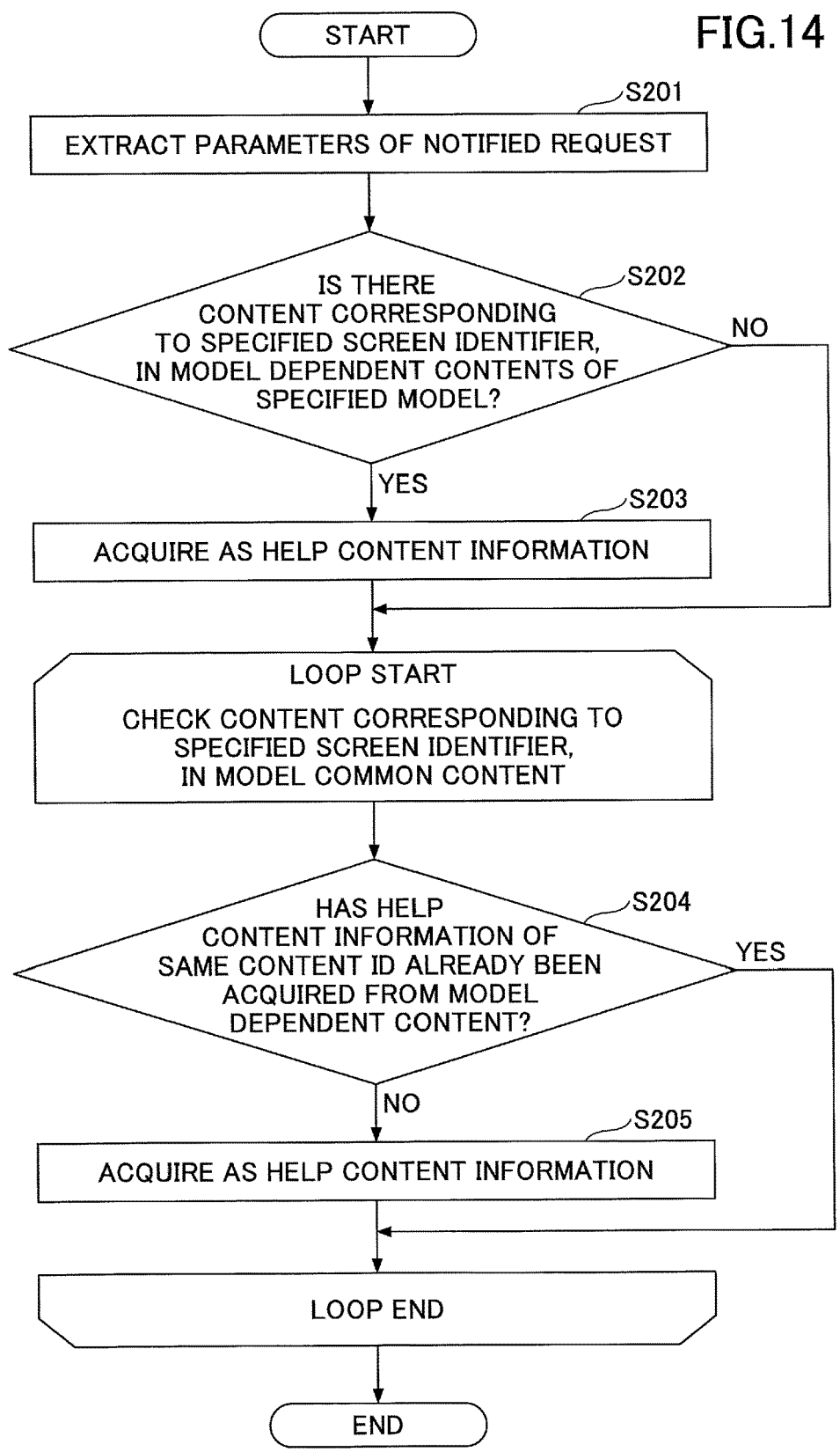
FIG. 14 is a flowchart of an example of a process for determining the help content information to be acquired, according to the second embodiment of the present invention.

The process of determining the help content information to be acquired using the help content presence/absence management information of FIG. 13 is performed, for example, by the procedure of FIG. 14. FIG. 14 is a flowchart of an example of a process for determining the help content information to be acquired.

In step S201, the content managing unit 33 of the content management server 30 extracts the parameters of the notified help content information acquisition request. The parameters correspond to a screen identifier, a display language, a destination, and a model name.

In step S202, the content managing unit 33 checks whether there is help content corresponding to the specified screen identifier in the model dependent content of the model name specified in the parameter. If corresponding help content exists, the content managing unit 33 acquires the help content corresponding to the specified screen identifier as help content information. If corresponding help content does not exist, the content managing unit 33 skips step S203.

Next, the content managing unit 33 sequentially checks the help contents corresponding to the screen identifiers specified in the parameters, with respect to the device common contents. In step S204, the content managing unit 33 checks whether help content information of the same content ID has already been acquired from the model dependent contents.

When the help content information of the same content ID has not already been acquired from the model dependent contents, the content managing unit 33 proceeds to step S205 and acquires the help content corresponding to the specified screen identifier as help content information. When the help content information has been acquired, the content managing unit 33 skips step S205.

By the process of the flowchart of FIG. 14, the content managing unit 33 can acquire the help content information preferentially from the model dependent contents, and can acquire the help content information of the content ID, which is not included in the model dependent contents, from the model common contents.

<Overview-Second Embodiment>

According to the information processing system 1 according to the second embodiment, based on the screen identifier of the application screen 1004 displayed when the help key 1002 is pressed and the device information of the image forming apparatus 10, appropriate help content can be identified. Therefore, in the information processing system 1 according to the second embodiment, when the help key 1002 is pressed, the help content suitable for the user is can be displayed on the operation part 105, rather than the help function of the related art that simply displays the top page of the help content.

Furthermore, according to the information processing system 1 according to the second embodiment, the help content information can be divided into model dependent contents and model common contents, and stored in the content management server 30. Therefore, the device provider of the image forming apparatus 10 can easily manage the help content information, and it is easy to customize the help content information.

According to one embodiment of the present invention, an information processing system is provided, which enables an electronic device that displays help content, to acquire help content compatible with the model, etc., of the electronic device, from outside of the electronic device The information processing system, the help display method, and the electronic device are not limited to the specific embodiments described in the detailed description, and variations and modifications may be made without departing from the spirit and scope of the present invention. Note that the display control unit 11 is an example of an accepting unit.

What is claimed is:

1. An information processing system comprising: an electronic device configured to display help content for helping a user of the electronic device; and an information processing apparatus configured to provide the help content to the electronic device, the information processing apparatus being arranged outside of the electronic device, the information processing apparatus communicating with the electronic device over a communication channel, wherein the information processing system includes a processor, in communication with a memory, executing a process including: accepting, from the user of the electronic device, an operation for displaying the help content, the operation being input via an operation part including a user interface of the electronic device; requesting to display the help content, upon specifying a screen identifier and device information of the electronic device, the screen identifier including an identifier of a screen that has been displayed on the operation part of the electronic device when the operation for displaying the help content has been accepted; acquiring, from the information processing apparatus, the help content compatible with the screen identifier of the screen and the device information of the electronic device that have been specified; and displaying the acquired help content on the operation part of the electronic device, wherein the requesting includes: requesting the information processing apparatus to check whether the electronic device is compatible with a function for displaying the help content, upon specifying at least the device information of the electronic device; controlling the electronic device to accept the operation from the user, in response to determining that a check result of the check indicates that the electronic device is compatible with the function for displaying the help content; and controlling the electronic device not to accept the operation from the user, in response to determining that the check result indicates that the electronic device is not compatible with the function for displaying the help content.

2. The information processing system according to claim 1, wherein the requesting includes: displaying information on the operation part of the electronic device, such that the operation can be accepted from the user, in response to determining that the check result indicates that the electronic device is compatible with the function for displaying the help content; and not displaying the information on the operation part of the electronic device, such that the operation cannot be accepted from the user, in response to determining that the check result indicates that the electronic device is not compatible with the function for displaying the help content.

3. The information processing system according to claim 1, wherein the requesting includes: requesting the information processing apparatus to check whether the help content exists, upon specifying at least the device information of the electronic device and the screen identifier of the screen; requesting to display the help content, in response to determining that a check result of the check indicates that the help content exists; and causing the operation part of the electronic device to perform an action for explicitly indicating that the help content does not exist, in response to determining that the check result indicates that the help content does not exist.

4. The information processing system according to claim 3, wherein the processor executes the process further including: managing, in the information processing apparatus, the help content so as to be divided into model dependent content that is dependent on a model of the electronic device, and model common content that is common to models of the electronic device; and selecting and providing the model dependent content, upon determining that the model dependent content and the model common content include overlapping help content, in response to a request to acquire the help content, the request specifying the screen identifier of the screen and the device information of the electronic device.

5. A help display method executed by a computer in an information processing system including an electronic device configured to display help content for helping a user of the electronic device and an information processing apparatus configured to provide the help content to the electronic device, the information processing apparatus being arranged outside of the electronic device, the information processing apparatus communicating with the electronic device over a communication channel, the help display method comprising: accepting, from the user of the electronic device, an operation for displaying the help content, the operation being input via an operation part including a user interface of the electronic device; requesting to display the help content, upon specifying a screen identifier and device information of the electronic device, the screen identifier including an identifier of a screen that has been displayed on the operation part of the electronic device when the operation for displaying the help content has been accepted; acquiring, from the information processing apparatus, the help content compatible with the screen identifier of the screen and the device information of the electronic device that have been specified; and displaying the acquired help content on the operation part of the electronic device, wherein the requesting includes: requesting the information processing apparatus to check whether the electronic device is compatible with a function for displaying the help content, upon specifying at least the device information of the electronic device; controlling the electronic device to accept the operation from the user, in response to determining that a check result of the check indicates that the electronic device is compatible with the function for displaying the help content; and controlling the electronic device not to accept the operation from the user, in response to determining that the check result indicates that the electronic device is not compatible with the function for displaying the help content.

6. The help display method according to claim 5, wherein the requesting includes: displaying information on the operation part of the electronic device, such that the operation can be accepted from the user, in response to determining that the check result indicates that the electronic device is compatible with the function for displaying the help content; and not displaying the information on the operation part of the electronic device, such that the operation cannot be accepted from the user, in response to determining that the check result indicates that the electronic device is not compatible with the function for displaying the help content.

7. The help display method according to claim 5, wherein the requesting includes: requesting the information processing apparatus to check whether the help content exists, upon specifying at least the device information of the electronic device and the screen identifier of the screen; requesting to display the help content, in response to determining that a check result of the check indicates that the help content exists; and causing the operation part of the electronic device to perform an action for explicitly indicating that the help content does not exist, in response to determining that the check result indicates that the help content does not exist.

8. The help display method according to claim 7, further comprising: managing, in the information processing apparatus, the help content so as to be divided into model dependent content that is dependent on a model of the electronic device, and model common content that is common to models of the electronic device; and selecting and providing the model dependent content, upon determining that the model dependent content and the model common content include overlapping help content, in response to a request to acquire the help content, the request specifying the screen identifier of the screen and the device information of the electronic device.

9. An electronic device configured to receive, from an information processing apparatus, help content to be displayed for helping a user of the electronic device, the information processing apparatus being arranged outside of the electronic device, the information processing apparatus communicating with the electronic device over a communication channel, the electronic device comprising a processor, in communication with a memory, executing a process including: accepting, from the user of the electronic device, an operation for displaying the help content, the operation being input via an operation part including a user interface of the electronic device; requesting to display the help content, upon specifying a screen identifier and device information of the electronic device, the screen identifier including an identifier of a screen that has been displayed on the operation part of the electronic device when the operation for displaying the help content has been accepted; acquiring, from the information processing apparatus, the help content compatible with the screen identifier of the screen and the device information of the electronic device that have been specified; and displaying the acquired help content on the operation part of the electronic device, wherein the requesting includes requesting the information processing apparatus to check whether the electronic device is compatible with a function for displaying the help content, upon specifying at least the device information of the electronic device, controlling the electronic device to accept the operation from the user, in response to determining that a check result of the check indicates that the electronic device is compatible with the function for displaying the help content, and controlling the electronic device not to accept the operation from the user, in response to determining that the check result indicates that the electronic device is not compatible with the function for displaying the help content.

10. The electronic device according to claim 9, wherein the requesting includes displaying information on the operation part of the electronic device, such that the operation can be accepted from the user, in response to determining that the check result indicates that the electronic device is compatible with the function for displaying the help content, and not displaying the information on the operation part of the electronic device, such that the operation cannot be accepted from the user, in response to determining that the check result indicates that the electronic device is not compatible with the function for displaying the help content.

11. he electronic device according to claim 9, wherein the requesting includes requesting the information processing apparatus to check whether the help content exists, upon specifying at least the device information of the electronic device and the screen identifier of the screen, requesting to display the help content, in response to determining that a check result of the check indicates that the help content exists, and causing the operation part of the electronic device to perform an action for explicitly indicating that the help content does not exist, in response to determining that the check result indicates that the help content does not exist.

12. The electronic device according to claim 11, wherein the processor executes the process further including: managing, in the information processing apparatus, the help content so as to be divided into model dependent content that is dependent on a model of the electronic device and model common content that is common to models of the electronic device, and selecting and providing the model dependent content, upon determining that the model dependent content and the model common content include overlapping help content, in response to a request to acquire the help content, the request specifying the screen identifier of the screen and the device information of the electronic device.

* * * * *